United States Patent
Sato

(10) Patent No.: US 6,963,470 B2
(45) Date of Patent: Nov. 8, 2005

(54) THIN FILM MAGNETIC HEAD HAVING IMPROVED HEAT RADIATING PROPERTY

(75) Inventor: Kiyoshi Sato, Niigata-ken (JP)

(73) Assignee: Alps Electic Co., Ltd., Tokyo (JP)

(*) Notice: Subject to any disclaimer, the term of this patent is extended or adjusted under 35 U.S.C. 154(b) by 139 days.

(21) Appl. No.: 10/623,763

(22) Filed: Jul. 21, 2003

(65) Prior Publication Data

US 2004/0017638 A1 Jan. 29, 2004

(30) Foreign Application Priority Data

Jul. 22, 2002 (JP) ........................ 2002-212691

(51) Int. Cl.[7] .............................................. G11B 5/147
(52) U.S. Cl. ...................................................... 360/126
(58) Field of Search ................................. 360/126, 317

(56) References Cited

U.S. PATENT DOCUMENTS 5,751,522 A 5/1998 Yamada et al.
6,396,660 B1 * 5/2002 Jensen et al. ............... 360/126
6,760,191 B1 * 7/2004 Yan et al. .................... 360/128
2002/0093772 A1 7/2002 Yoshida et al.

FOREIGN PATENT DOCUMENTS

| JP | 6-150253 | 5/1994 |
| JP | 2001-209909 | 8/2001 |
| JP | 2001-236614 | 8/2001 |

* cited by examiner

Primary Examiner—Robert S. Tupper
(74) Attorney, Agent, or Firm—Brinks Hofer Gilson & Lione

(57) ABSTRACT

An upper radiating layer is formed around a lower core layer without making contact with the lower core layer, and each of first and second coils has a portion facing the lower core layer and a portion facing the upper radiating layer so that heat of the first and second coils is released to the upper radiating layer.

21 Claims, 7 Drawing Sheets

THIN FILM MAGNETIC HEAD HAVING IMPROVED HEAT RADIATING PROPERTY

This application claims the benefit of priority to Japanese Patent Application 2002-212691, filed on Sep. 22, 2002.

BACKGROUND OF THE INVENTION

1. Field of the Invention

The present invention relates to a thin film magnetic head provided, for example, at the trailing side end of a slider facing a magnetic recording medium, and particularly to a thin film magnetic head having an excellent heat radiating property.

2. Description of the Related Art

As shown in FIG. 6, a conventional thin film magnetic head comprises a recording head section h85 provided at the trailing-side end 81a of a slider 81. The recording head section h85 serves as an inductive head comprising a lower core layer 82, an upper core layer 83, and a coil 84 provided between both core layers 82 and 83. In this recording head section h85, a magnetic gap layer 85 is provided between the front ends of the lower and upper core layers 82 and 83, the upper and lower core layers 83 and 82 being magnetically connected to a rear portion. The recording head section h85 is covered with a protective layer 86 made of an insulating material such as $Al_2O_3$ or the like.

In a magnetic recording apparatus on which a hard magnetic disk is mounted, when magnetic recording is performed on the magnetic disk serving as a magnetic medium by the recording head section h85, the slider 81 floats with a small distance from the magnetic disk.

In the recording head section h85, a recording current is applied to the coil 84, and a magnetic field induced by the recording current in the lower and upper coil layers 82 and 83 leaks as a leakage magnetic field from the magnetic gap 85 to be applied as a recording magnetic field to the magnetic disk.

In this conventional thin film magnetic head, the temperature of the recording head section h85 increases due to the heat generated from the coil 84, and thus the recording head section h85 thermally expands to project from the surface 81b of the slider 81, which faces the recording medium.

Although the temperature of the recording head section h85 also increases due to an eddy current produced in the lower and upper core layers 82 and 83, the temperature of the recording head section h85 increases mainly due to the heat generated from the coil 84. This is indicated by a graph of FIG. 7 in which the amount of projection from the slider increases as the DC resistance of the coil 84 increases.

Particularly, in a thin film magnetic head capable of high-density recording, the coil 84 generates a large quantity of heat because the recording current supplied to the coil 84 has a high frequency. Therefore, the temperature of the recording head section h85 increases to increase the amount of projection from the facing surface 81b.

In a magnetic recording apparatus capable of high-density and high-speed recording, the distance between the magnetic medium and the facing surface 81b of the slider 81 is decreased, and thus projection of the recording head section h85 causes a collision of the recording head section h85 with the magnetic medium with high frequency. This highly probably causes a damage to the recording medium and a damage to the recording head section h85.

SUMMARY OF THE INVENTION

Accordingly, it is an object of the present invention to provide a thin film magnetic head capable of suppressing thermal expansion of a recording head section to enable adaptation to a magnetic recording apparatus with a higher recording density and higher frequency.

A thin film magnetic head of the present invention comprises a lower core layer, an upper core layer, a recording section comprising a nonmagnetic gap layer formed between the lower and upper core layers near a surface facing a recording medium, a connecting portion for magnetically connecting the lower core layer and the upper core layer in the rear of the recording section, and a coil comprising a conductor layer wound in a spiral planar shape around the connecting portion, wherein a first radiating layer is formed in the rear of the lower core layer to be separated from the lower core layer, and the coil has a portion facing the lower core layer through an insulating layer, and a portion facing the first radiating layer through the insulating layer.

The lower core layer comprises a magnetic metal which can be plated, for example, permalloy or the like, and the first radiating layer preferably comprises a metal layer which can be plated. In this thin film magnetic head, heat generated from the coil is released to the first radiating layer to suppress thermal expansion of the recording section due the heat of the coil. When the first radiating layer is in contact with the lower core layer, a magnetic flux of the lower core layer flows into the first radiating layer to change the inductance of the recording section, thereby undesirably change the characteristics of the recording section. Although the facing area between the first radiating layer and the conductor layer of the coil is preferably as large as possible, the first radiating layer may oppose a portion of the conductor layer of the coil.

A thin film magnetic head of the present invention comprises a lower core layer, an upper core layer, a recording section comprising a nonmagnetic gap layer formed between the lower and upper core layers near a surface facing a recording medium, a connecting portion for magnetically connecting the lower core layer and the upper core layer in the rear of the recording section, a coil comprising a conductor layer wound in a spiral planar shape around the connecting portion, an upper shield layer provided below the lower core layer with a separating insulating layer provided therebetween and made of an insulating material, a reproducing magnetoresistive element provided below the upper shield layer near the surface facing the recording medium, a lower shield layer provided below the magnetoresistive element with an insulating layer provided therebetween, and at least one of first, second and third radiating layers is provided, wherein the first radiating layer is formed in the rear of the lower core layer to be separated from the lower core layer, the second radiating layer is formed in the rear of the upper shield layer to be separated from the upper shield layer, and the third radiating layer is formed in the rear of the lower shield layer to be separated from the lower shield layer.

The coil has a portion facing the lower core layer through an insulating layer, and a portion facing any one of the first, second and third radiating layers through the insulating layer.

In the thin film magnetic head, heat generated from the coil is released to any one of the first, second and third radiating layers to suppress thermal expansion of the recording section due the heat of the coil.

When each of the lower core layer, the upper shield layer and the lower shield layer comprises a magnetic metal such as permalloy or the like, at least one of the first, second and third radiating layers preferably comprises a material having high thermal conductivity, such as Cu, Au, or the like, because the heat of the coil is more released to the radiating layer than to the lower core layer, the upper shield layer and the lower shield layer.

In the present invention, at least two of the first, second and third radiating layers are preferably provided to partially face each other in the thickness direction.

In the present invention, assuming that a direction parallel to the direction in which the track width of the recording section is determined is a width direction, the second radiating layer preferably extends to both ends of the upper shield layer in the width direction.

The direction in which the track width is determined is the width direction in the planar direction of the nonmagnetic gap layer exposed at the surface facing the magnetic recording medium. The area of the second radiating layer is preferably as large as possible for increasing a heat capacity, and thus the second radiating layer is preferably formed on both sides of the upper shield layer behind the upper shield layer (on the side apart from the surface facing the magnetic recording medium). However, if the second radiating layer is exposed at the surface facing the magnetic recording medium, the second radiating layer possibly comes in contact with the magnetic recording medium due to thermal expansion. Therefore, the second radiating layer is preferably retracted from the surface facing the magnetic recording medium (this applies to the second and third radiating layers).

In the thin film magnetic head of the present invention, the second radiating layer can be formed to the same thickness as the upper shield layer by using the same material as the upper shield layer.

In this thin film magnetic head, the second radiating layer and the upper shield layer can be formed at the same time. Since the magnetic metal such as permalloy or the like, which is used for forming the upper shield layer, has somewhat high thermal conductivity, this material can also be used for the second radiating layer. Also, the second radiating layer and the upper shield layer are formed to the same thickness to permit the coil to be formed on a flat surface.

The second radiating layer can be formed to the same thickness as that of the upper shield layer by using a material having higher thermal conductivity than that of the upper shield layer.

With the second radiating layer having higher thermal conductivity, the heat of the coil is more released to the second radiating layer than to the lower core layer, and thus the temperature of the coil released to the upper shield layer side decreases, thereby further suppressing a temperature rise of the recording section. The second radiating layer preferably comprises a nonmagnetic metal, for example, a metal or an alloy of at least two metals selected from Au, Ag, Pt, Cu, Cr, Al, Ti, Sn, NiP, Mo, W, Pd, Rh, Ni and CuNi, or a laminate comprising at least two selected from these metal materials. Furthermore, the second radiating layer preferably comprises a metal which can be plated. The second radiating layer and the upper shield layer can be formed to the same thickness to permit the coil surface to be formed on a flat surface.

In the thin film magnetic head of the present invention, the second radiating layer and first radiating layer are preferably connected to each other through a first connecting portion.

The first and second radiating layers are combined together with the first connecting portion to increase a heat capacity, and thus the heat of the coil is easily released to the first and second radiating layers.

Although the first connecting portion preferably comprises a metal, an insulating material may be used as long as it has higher thermal conductivity than that of the separating insulating layer. For example, when the separating insulating layer is composed of $Al_2O_3$, the first connecting portion may comprise an insulating material such as AlN having high thermal conductivity. The first connecting portion is preferably formed in contact with almost the entire surface of the first and second radiating layers.

In the thin film magnetic head of the present invention, the first connecting portion is formed integrally with one of the first and second radiating layers.

In the thin film magnetic head, the first connecting portion can be formed in the same step as that of the first and second radiating layers.

In the present invention, assuming that a direction along the direction in which the track width of the recording section is determined is the width direction, the third radiating layer preferably extends to both ends of the lower shielding layer in the width direction. In this way, the third radiating layer is preferably as wide as possible for increasing the heat capacity.

In the thin film magnetic head of the present invention, the third radiating layer may be formed to the same thickness as that of the lower shield layer by using the same material as the lower shield layer.

In the thin film magnetic head, the lower shield layer and the third radiating layer can be formed at the same time. When the lower shield layer and the third radiating layer have the same thickness, the upper shield layer and the second radiating layer can be formed on a flat surface, and the lower core layer and the first radiating layer can also be formed on a flat surface, thereby permitting the coil to be formed on a flat surface.

The third radiating layer may be formed to the same thickness as that of the lower shield layer by using a material having higher thermal conductivity than that of the lower shield layer.

The third radiating layer is preferably composed of a metal such as Au, Cu or the like which can be plated. When the lower shield layer and the third radiating layer have the same thickness, the upper shield layer and the second radiating layer can be formed on a flat surface, and the lower core layer and the first radiating layer can also be formed on a flat surface, thereby permitting the coil to be formed on a flat surface.

In the thin film magnetic head of the present invention, the third radiating layer and the second radiating layer are more preferably connected to each other through a second connecting portion.

The second and third radiating layers are combined together with the second connecting portion to facilitate the conduction of heat of the first radiating layer.

Although the second connecting portion preferably comprises a metal, an insulating material may be used as long as it has higher thermal conductivity than that of the insulating layer held between the upper and lower shield layers. For example, when the insulating layer held between the upper and lower shield layers is composed of $Al_2O_3$, the second connecting portion may comprise an insulating material such as AlN having high thermal conductivity.

In the thin film magnetic head of the present invention, the second connecting portion is formed integrally with one of the second and third radiating layers.

In the thin film magnetic head, the second connecting portion can be formed in the same step as that of the second and third radiating layers.

In the present invention, assuming that a direction along the direction in which the track width of the recording section is determined is the width direction, the first radiating layer preferably extends to both ends of the lower core layer in the width direction. In this way, the first radiating layer is preferably as wide as possible for increasing the heat capacity.

In the present invention, the first radiating layer is preferably formed to the same thickness as that of the lower core layer by using the same material as the lower core layer. In this thin film magnetic head, the lower core layer and the first radiating layer can be formed at the same time. When the lower core layer and the first radiating layer have the same thickness, the coil can be formed on a flat surface.

In the present invention, the first radiating layer may be formed to the same thickness as that of the lower core layer by using a material having higher thermal conductivity than that of the lower core layer.

The first radiating layer is preferably composed of a metal such as Au, Cu or the like which can be plated. When the lower core layer and the first radiating layer have the same thickness, the coil can be formed on a flat surface.

In the thin film magnetic head of the present invention, the facing area between the coil and the lower core layer is larger than that between the coil and the first radiating layer.

The coil is formed by winding a conductor layer comprising a highly conductive material so that the conductor layer of the coil formed on the first radiating layer is wider than that formed on the lower core layer, and thus the heat generated from the conductor layer formed on the lower core layer is transmitted to the conductor layer formed on the first radiating layer to easily release the heat to the first radiating layer. Also, the winding pitch (the pitch of the conductor in a section of the coil) of the conductor layer may be increased.

DESCRIPTION OF THE PREFERRED EMBODIMENTS

Figure 1:
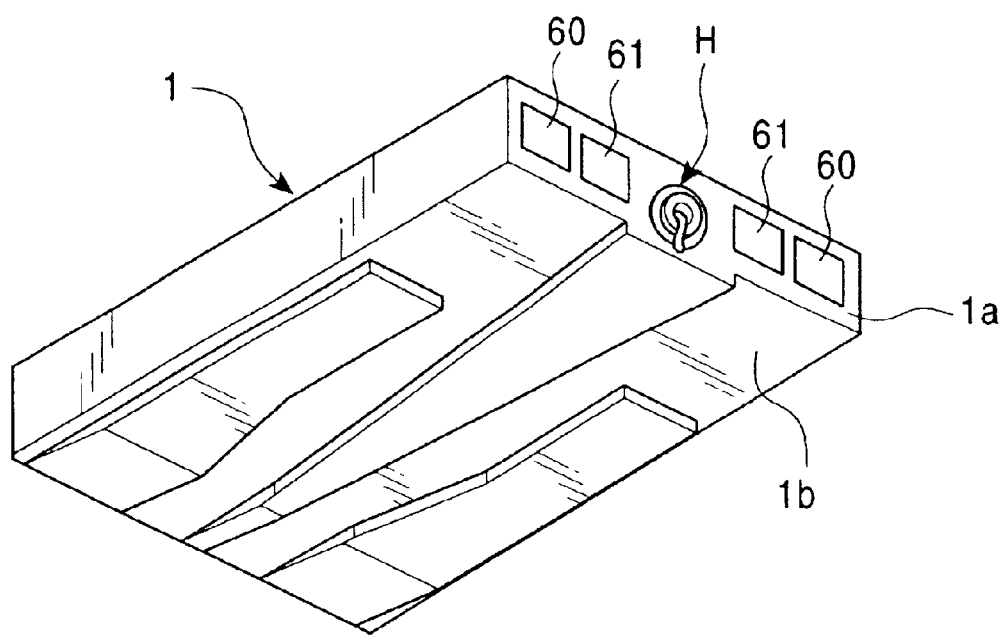
FIG. 1 is a perspective view showing the whole of a slider on which a thin film magnetic head of the present invention is formed.

The magnetic head device shown in FIG. 1 comprises a substantially rectangular slider 1 composed of $Al_2O_3$—TiC, the slider 1 having a facing surface 1b facing a recording medium serving as a hard magnetic disk. In the slider 1, a thin film magnetic head H, terminal layers 60 and 61 are formed on the trailing-side end surface 1a. The thin film magnetic head H is a combination type comprising a reproducing section h1 and a recording section h2.

Figure 2:
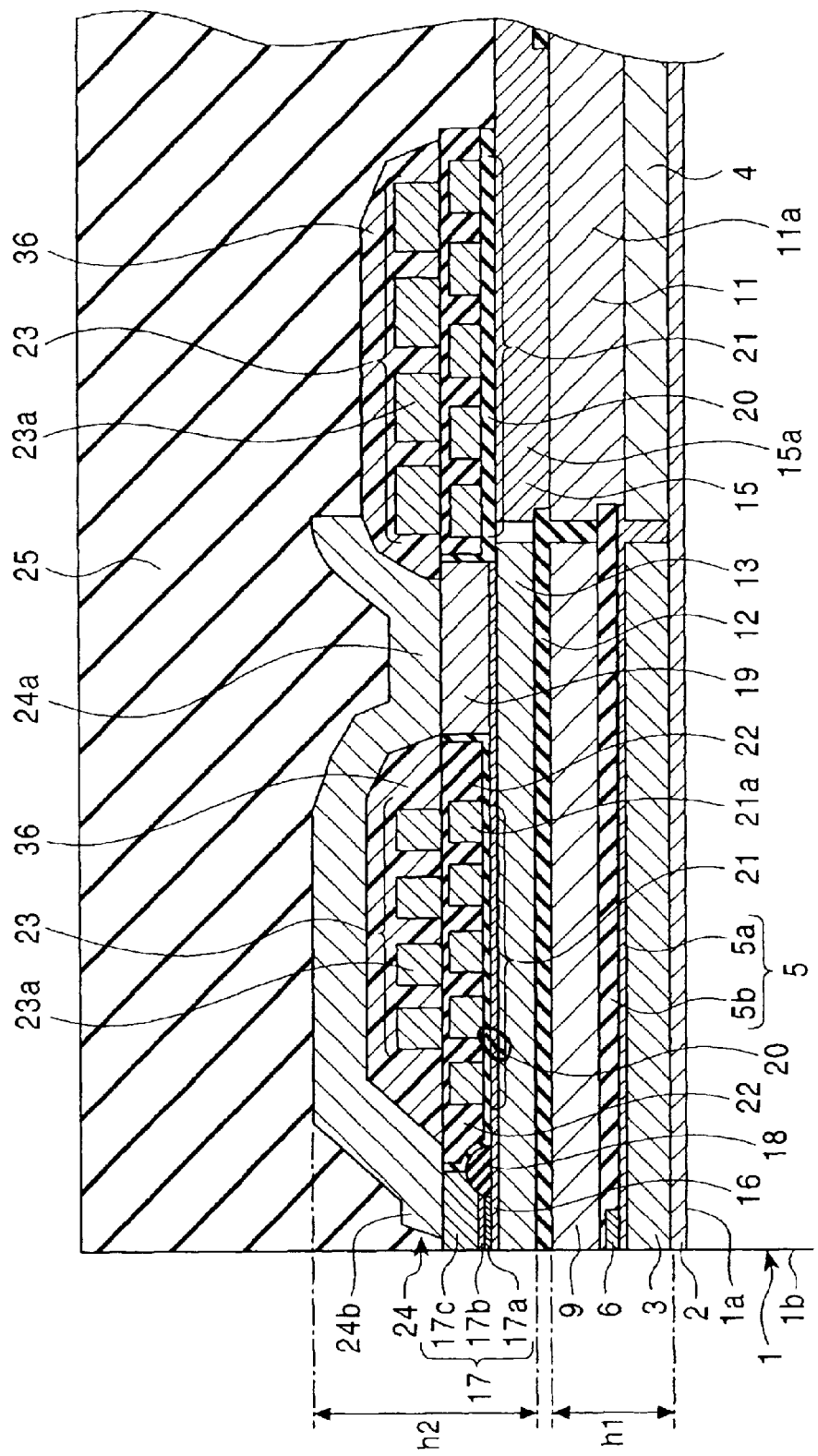
FIG. 2 is a sectional view of a thin film magnetic head according to a first embodiment of the present invention.

FIG. 2 is a sectional view of a thin film magnetic head according to a first embodiment of the present invention. Referring to FIG. 2, a reproducing section h1 and recording section h2 of the thin film magnetic head are laminated in order on the trailing-side end surface 1a of a slider 1.

The end surface 1a of the slider 1 is covered with an undercoat 2 composed of $Al_2O_3$. Also, the reproducing section h1 comprising a lower shield layer 3 composed of permalloy is formed on the undercoat 2. The front end of the lower shield layer 3 is exposed at the magnetic disk-facing surface 1b of the slider 1. A direction in which the track width is determined is defined as the planar direction (perpendicular to the drawing of FIG. 2) of the end surface 1a, as viewed from the magnetic disk-facing surface 1b of the slider 1.

Furthermore, a lower radiating layer (third radiating layer) 4 comprising the same permalloy material as that of the lower shield layer 3 is formed in the rear of the lower shield layer 3 ("the rear" means the side apart from the magnetic disk-facing surface 1b). The lower shield layer 3 and the lower radiating layer 4 are formed with a space therebetween without making contact.

Furthermore, an insulating layer 5 comprising first and second layers 5a and 5b each composed of $Al_2O_3$ is laminated to cover the lower shield layer 3 formed on the undercoat 2. Only a front edge portion of the lower radiating layer 4 is coated with the insulating layer 5, and substantially the entire upper surface of the lower radiating layer 4 is exposed from the insulating layer 5.

Furthermore, a magnetoresistive element 6 of the reproducing section h1 is formed on the lower shield layer 3 through the first layer 5a of the insulating layer 5. The magnetoresistive element 6 comprises a GMR element such as a spin valve film utilizing a giant magnetoresistive effect, or an AMR element utilizing an anisotropic magnetoresistive effect. The front end of the magnetoresistive element 6 is exposed at the magnetic disk-facing surface 1b of the slider 1.

A pair electrode layers (not shown in the drawing) is formed on both sides of the magnetoresistive element 6 to be connected to the magnetoresistive element 6. The distance between the pair of the electrode layers coincides with the reproducing track width dimension.

The second layer 5b of the insulating layer 5 is formed on the first layer 5a to cover the magnetoresistive element 6.

As shown in FIG. 2, an upper shield layer 9 composed of permalloy is also formed on the insulating layer 5. The upper shield layer 9 faces the lower shield layer 3, and the front end is exposed at the magnetic disk-facing surface 1b of the slider 1.

In this way, the reproducing section h1 comprises the magnetoresistive element 6 interposed between the upper shield layer 9 and the lower shield layer 3. The first and second layers 5a and 5b of the insulating layer 5 are held between the magnetoresistive element 6 and the lower shield layer 3 and between the magnetoresistive element 6 and the upper shield layer 9, respectively, so that the magnetoresistive element 6 is insulated from the lower shield layer 3 and the upper shield layer 9.

Also, an intermediate radiating layer (second radiating layer) 11 composed of the same permalloy as that of the upper shield layer 9 is formed on the insulating layer 5. The intermediate radiating layer 11 is formed to cover the portion of the lower radiating layer 4, which is exposed from the insulating layer 5. The intermediate radiating layer 11 has substantially the same size as the lower radiating layer 4 and faces substantially the entire surface of the lower radiating layer 4 in the thickness direction.

The intermediate radiating layer 11 has a second connecting portion 11a formed integrally with the intermediate radiating layer 11 to pass through the insulating layer 5 and come in contact with the portion of the lower radiating layer 4 which is exposed from the insulating layer 5. Thus, the intermediate radiating layer 11 is connected to the lower radiating layer 4 through the second connecting portion 11a integral with the intermediate radiating layer 11.

The intermediate radiating layer 11 is formed in the rear of the upper shield layer 9 without making contact with the upper shield layer 9 and a conductive connecting portion (not shown). When the intermediate radiating layer 11 is separated from the upper shield layer 9, heat of the intermediate radiating layer 11 is less transmitted to the upper shield layer 9, thereby decreasing the effect of a temperature rise of the upper shield layer 9 on the magnetoresistive element 6.

The upper shield layer 9 is covered with a separating insulating layer 12 composed of $Al_2O_3$. Almost the entire upper surface of the intermediate radiating layer 11 is exposed from the separating insulating layer 12.

Furthermore, the recording head section h2 is formed on the reproducing section h1 through the separating insulating layer 12. The recording head section h2 shown in FIG. 2 comprises an inductive head. In this inductive head, a lower core layer 13 composed of permalloy is formed on the separating insulating layer 12. The front end of the lower core layer 13 is exposed at the facing surface 1b.

An upper radiating layer (second radiating layer) 15 composed of the same permalloy as the lower core layer 13 is formed on the separating insulating layer 12. The upper radiating layer 15 is formed to cover the portion of the intermediate radiating layer 11, which is exposed from the separating insulating layer 12.

The upper radiating layer 15 has a first connecting portion 15a formed integrally with the upper radiating layer 15 to pass through the separating insulating layer 12 and come in contact with the portion of the intermediate radiating layer 11 which is exposed from the separating insulating layer 12. The upper radiating layer 15 is connected to the intermediate radiating layer 11 through the first connecting portion 15a integral with the upper radiating layer 15.

The upper radiating layer 15 has substantially the same size as that of the intermediate radiating layer 11, and faces almost the entire surface of the intermediate radiating layer 11 in the thickness direction.

The upper radiating layer 15 is formed in the rear of the lower core layer 13 without making contact with a connecting portion (not shown in the drawing) in the rear of the electrode layers which are electrically connected to the lower core layer 13 and the magnetoresistive element 6. When the upper radiating layer 15 is separated from the lower core layer, a magnetic field of the lower core layer 13 does not flow into the upper radiating layer 15, and thus the upper radiating layer 15 causes no change in inductance of the recording head section h2.

In the recording head section h2, a plated underlying layer 16 comprising a conductive material is formed on the lower core layer 13.

In the recording head section h2, a recording core section 17 is formed by plating on the plated underlying layer 16 near the facing surface 1b, the recording core section 17 being exposed at the facing surface 1b. The recording core section 17 comprises a lower magnetic pole layer 17a made of a magnetic metal material, which is grown by plating on the plated underlying layer 16, a nonmagnetic gap layer 17b made of a nonmagnetic metal such as NiP or the like which is grown by plating on the lower magnetic pole layer 17a, and an upper magnetic pole layer 17c made of a magnetic metal material, which is grown by plating on the nonmagnetic gap layer 17b.

In a thin film magnetic head adaptable for high-density recording, the track width dimension (the width dimension perpendicular to the drawing of FIG. 2) of the recording core section 17 at the facing surface 1b is preferably 0.7 $\mu$m or less, and more preferably 0.5 $\mu$m or less. The height dimension (thickness dimension) of the lower magnetic pole layer 17a is, for example, about 0.3 $\mu$m, the height dimension (thickness dimension) of the nonmagnetic gap layer 17b is, for example, about 0.1 $\mu$m, and the height dimension (thickness dimension) of the upper magnetic pole layer 17c is, for example, about 2.4 $\mu$m to 2.7 $\mu$m.

Although the lower and upper magnetic pole layers 17a and 17c may be made of the same magnetic material as that of the lower core layer 13, both magnetic pole layers 17a and 17c are preferably made of a magnetic material having a higher saturation magnetic flux density than that of the lower core layer 13.

In this embodiment, a Gd-determining insulating layer 18 made of an organic insulating material is formed behind the facing surface 1b so that the depth dimension of the nonmagnetic gap layer 17b is determined by the Gd-determining insulating layer 18.

Also, a connecting layer 19 comprising a magnetic metal material is formed on the plated insulating layer 16 inside the thin film magnetic head so that the connecting layer 19 is magnetically connected to the lower core layer 13.

In all regions except the recording core section 17 and the connecting layer 19, an insulating underlying layer 20 is formed to cover the plated underlying layer 16 and the Gd-determining insulating layer 18. The upper radiating layer 15 is covered with the insulating underlying layer 20.

Furthermore, a first coil 21 is provided on the insulating underlying layer 20. The first coil 21 comprises a conductor layer 21a which comprises a good conductor having low resistivity, such as Cu or the like, and which is wound in a spiral planar shape around the connecting layer 19. The first coil 21 has a region facing the lower core layer 13, and a region facing the upper radiating layer 15. The region of the first coil 21 which faces the upper radiating layer 15 preferably faces the upper radiating layer 15 over substantially the whole region behind the region facing the lower core layer 13.

In the first coil 21, the conductor layer 21a in the region facing the upper radiating layer 15 is wider than that in the region facing the lower core layer 13.

In this first coil 21, heat is generated from the lower core layer 13 side in which the conductor layer 21a has a smaller width, but the heat generated from the lower core layer 13 side transfers to the upper radiating layer 15 side and is easily resealed to the upper radiating layer 15 because the conductor layer 21a comprising the good conductor has high thermal conductivity.

In the first coil 21, the pitch of the conductor layer 21a in a portion between the recording core section 17 and the connecting layer 19 is smaller than that in other portions. In this structure of the first coil 21, the distance between the recording core section 17 and the connecting layer 19 can be decreased to achieve the recording head section h2 having a short magnetic path and low inductance.

The conductor layer 21a of the first coil 21 is buried in a first coil insulating layer 22 so that the first coil 21 is covered with the first coil insulating layer 22.

As an inorganic insulating material used for forming the first coil insulating layer 22, at least one material is preferably selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON. The conductor layer 21a of the first coil 21 may be buried in an organic insulating material such as resist or the like.

A second coil 23 is formed on the first coil insulating layer 22. The second coil 23 comprises a conductor layer 23a which comprises a good conductor such as Cu or the like and which is wound in a spiral planar shape around the connecting layer 19. In the second coil 23, the central end of the conductor layer 23a passes through the first coil insulating layer 22 and is connected to the center of the first coil 21.

The second coil 23 has a region facing the lower core layer 13 and a region facing the upper radiating layer 15. Like in the first coil 21, in the second coil 23, the upper radiating layer 15 preferably faces the upper radiating layer 15 over substantially the whole region behind the region facing the lower core layer 13.

In the second coil 23, the conductor layer 23a in the region facing the upper radiating layer 15 is wider than that in the region facing the lower core layer 13. Like in the first coil 21, in the second coil, therefore, heat of the conductor layer 23a is easily released to the upper radiating layer 15.

Also, a second coil insulating layer 36 made of resist is formed on the first coil insulating layer 22 so that the second coil 23 is covered with the second coil insulating layer 36. The conductor layer 23a of the second coil 23 is also buried in the second coil insulating layer 36.

Furthermore, an upper core layer 24 comprising permalloy is formed on the second coil insulating layer 36. The upper core layer 24 is insulated from the second coil 23 by the second coil insulating layer 36, and the base end 24a of the upper core layer 24 is connected to the connecting layer 19, the front end 24b being connected to the top of the upper magnetic pole layer 17c of the recording core section 17.

The front end 24b of the upper core layer 24 is not exposed at the magnetic disk-facing surface 1b, and has an inclined surface which starts from a position retracted from the facing surface 1b in the height direction so as to separate from the magnetic disk-facing surface 1b in the direction away from the recording core section 17.

A protective layer 25 comprising an insulating material such as $Al_2O_3$ or the like is formed to cover the recording head section h2, a portion of the protective layer 25 being coplanar with the facing surface 1b.

Furthermore, the terminal layers 60 and 61 shown in FIG. 1 are formed on the protective layer 25. Each of the terminal layers 60 and 61 comprises a metal material having low resistivity, for example, any one of Au, Ag, Pt and Cu, an alloy of at least two of these metal materials, or a laminate of at least two of these metal materials.

The ends of the first coil 21 and the second coil 23 of the recording head section h2 are electrically connected to the respective terminal layers 61. The connecting portions (not shown in the drawing) behind the electrode layers electrically connected to both sides of the magnetoresistive element 6 of the reproducing section h1 are electrically connected to the respective terminal layers 60.

Each of the terminal layers 60 and 61 functions as a so-called bonding pad, and a wire or a lead of a flexible printed board connected to each terminal layer is electrically connected to an electric circuit provided on a magnetic recording reproducing unit.

Next, the method of manufacturing the above-described thin film magnetic head will be described.

A permalloy film is formed by plating on the under coat 2 formed on the $Al_2O_3$—TiC substrate to form the lower shield layer 3 and the lower radiating layer 4 at the same time, and then the lower shield layer 3 and the lower radiating layer 4 are planarized by chemical mechanical polishing (referred to as "CMP" hereinafter). Next, the magnetoresistive element 6 and the insulating layer 5 are formed, and then the insulating layer 5 is partially removed from the top of the lower radiating layer 4.

Next, a permalloy film is formed by plating on the insulating layer 5 which covers the lower shield layer 3 and the magnetoresistive element 6 to form the upper shield layer 9 and the intermediate radiating layer 11 at the same time. Since the insulating layer 5 is absent from the top of the lower radiating layer 4, the second connecting portion 11a is formed in the intermediate radiating layer 11 in contact with the lower radiating layer 4. Then, the upper shield layer 9 and the intermediate radiating layer 11 are planarized by CMP.

Then, the separating insulating layer 12 is formed to cover the upper shield layer 9 and the intermediate radiating layer 11, and then the separating insulating layer 12 is partially removed from the top of the intermediate radiating layer 11.

Next, a permalloy film is formed by plating on the separating insulating layer 12 to form the lower core layer 13 of the recording section h2 and the upper radiating layer 15 at the same time. At this time, the separating insulating layer 12 is absent from the top of the intermediate radiating layer 11, and thus the first connecting portion 15a is formed in the upper radiating layer 15 to come in contact with the intermediate radiating layer 11. Then, the lower core layer 13 and the upper radiating layer 15 are planarized by CMP.

Then, the Gd-determining insulating layer 18, the recording core section 17, the connecting layer 19, the first and second coils 21 and 23, the upper core layer 24, etc. of the recording head section h2 are formed on the lower core layer 13, and then the protective layer 25 is formed to cover the recording head section h2.

In the method of manufacturing the thin film magnetic head, the lower radiating layer 4, the intermediate radiating layer 11 and the upper radiating layer 15 are formed at the same time as the lower shield layer 3, the upper shield layer 9 and the lower core layer 13 by using the same materials as those of the lower shield layer 3, the upper shield layer 9 and the lower core layer 13, respectively. Therefore, the number of steps and the number of materials are not increased by proving each of the radiating layers 4, 11 and 15.

The magnetic head device shown in FIG. 1 is mounted on a magnetic recording/reproducing unit such as a hard magnetic disk device or the like. The slider 1 of the magnetic head device is supported by an elastic supporting member comprising a thin plate spring so that the facing surface 1b of the slider 1 faces the magnetic recording medium such as a magnetic disk (not shown in the drawing) or the like. When the magnetic recording medium rotates, the slider 1 floats with a small distance from the magnetic recording medium due to an airflow produced on the surface of the magnetic recording medium, or the slider 1 slides on the magnetic recording medium.

In magnetic recording on the magnetic medium such as the magnetic disk or the like by using the thin film magnetic head, a recording current is applied to the first and second coils 21 and 23 of the recording section h2. The recording current flowing through the first coil 21 and second coil 23 induces a magnetic field in the lower core layer 13 and the upper core layer 24. The magnetic field leaks as a leakage magnetic field form the nonmagnetic gap layer 17b to magnetize the magnetic recording medium by the leakage magnetic field.

At the same time, a magnetic path is formed between the upper core layer 24 and the lower core layer 13 through the recording core section 17 and the connecting layer 19. Since each of the conductor layer 21a of the first coil 21 and the conductor layer 23a of the second coil 23 has a smaller width in the region between the recording core section 17 and the connecting layer 19 to decrease the distance between the recording core section 17 and the connecting layer 19, the recording head section h2 has a short magnetic path and can thus effectively magnetize the magnetic recording medium.

In each of the first coil 21 and second coil 23, Joule heat is generated by the recording current. The upper radiating layer 15 is combined with the intermediate radiating layer 11 and the lower radiating layer 4 through the first connecting portion 15a of the upper radiating layer 15 and the second connecting portion 11a of the intermediate radiating layer 11 to increase the heat capacity, and thus the heat of the first coil 21 and second coil 23 can easily be released. The heat of the first coil 21 and second coil 23 is released to the upper radiating layer 15, the intermediate radiating layer 11 and the lower radiating layer 4, which are combined together, and thus released to the slider 1 from the lower radiating layer 4.

The conductor layer 21a of the first coil 21 and the conductor layer 23a of the second coil 23 formed on the upper radiating layer 15 are wider than those formed on the lower core layer 13. Each of the conductor layer 21a of the first coil 21 and the conductor layer 23a of the second coil 23 comprises a good conductor, and thus has excellent thermal conductivity. Therefore, heat of the first coil 21 and the second coil 23 is transferred from the lower core layer 13 side to the upper radiating layer 15 side and released to the upper radiating layer 15.

Although the temperature of the recording section h2 also increases due to an eddy current produced in the upper core layer 24 and the lower core layer 13, the temperature mainly increases due to the recording current flowing through the first coil 21 and the second coil 23.

In this way, the heat of the first coil 21 and the second coil 23 is released to the upper radiating layer 15, the intermediate radiating layer 11 and the lower radiating layer 4 to prevent the recording section h2 from being heated to a high temperature. As a result, the recording section h2 less thermally expands, thereby suppressing the projection of the recording section h2 from the facing surface 1b of the slider 1.

Therefore, even in a hard magnetic disk device in which the distance between the magnetic disk-facing surface 1b of the slider 1 and the magnetic recording medium (magnetic disk) is, for example, as small as 10 nm or less with increases in the recording density and frequency, direct contact between the recording section h2 and the magnetic recording medium can be prevented.

Also, in the thin film magnetic head, when a magnetic record on the magnetic medium such as the magnetic disk is reproduced, a magnetic field leaking from the magnetic disk is detected by the magnetoresistive element 6 between the upper shield layer 9 and the lower shield layer 3 to cause a change the electric resistance due to the leakage magnetic field. Thus, the magnetic record is reproduced based on the change in the electric resistance.

In the reproducing operation, in the reproducing section h1, the lower shield layer 3 and the upper shield layer 9 are separated from the lower radiating layer 4 and the intermediate radiating layer 11, respectively, so that the heat is less transferred from the lower radiating layer 4 and the intermediate radiating layer 11 to the lower shield layer 3 and the upper shield layer 9, respectively, thereby preventing heating the lower shield layer 3 and the upper shield layer 9 to a high temperature. Also, a temperature rise of the recording section h2 is suppressed to prevent the reproducing section h1 from being heated by the heat of the recording section h2 to a high temperature.

In the reproducing section h1, the magnetic properties of the magnetoresistive element 6 less vary with the temperature rise of the lower shield layer 3 and the upper shield layer 9, and the electric resistance less varies with a temperature, thereby permitting the magnetic record to be precisely reproduced based on the change in the electric resistance of the magnetoresistive element 6.

Figure 3:
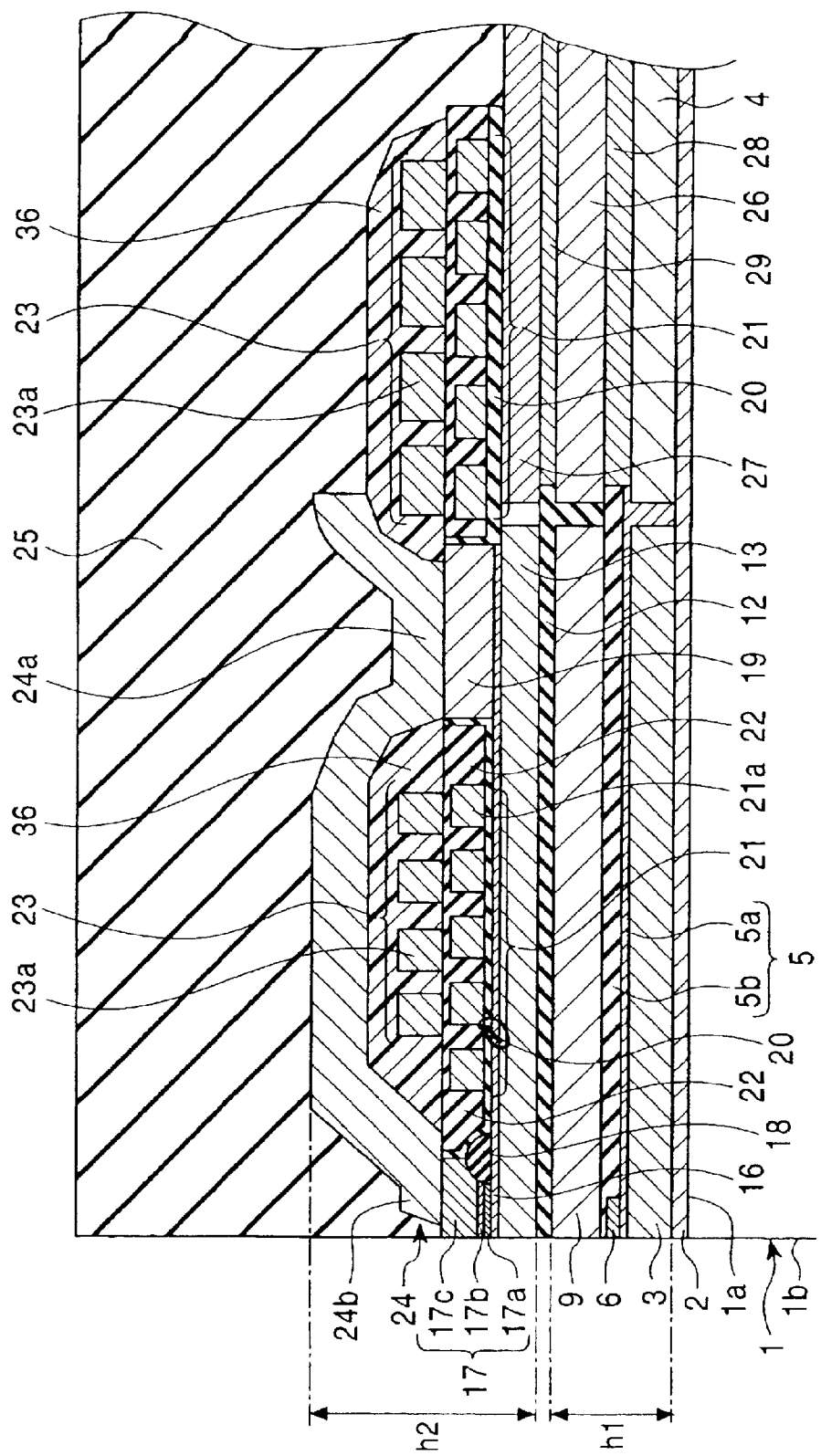
FIG. 3 is a sectional view of a thin film magnetic head according to a second embodiment of the present invention.

FIG. 3 is a sectional view of a thin film magnetic head according to a second embodiment of the present invention. In the embodiment shown in FIG. 3, the same members as in the first embodiment are denoted by the same reference numerals, and the description thereof is omitted. Herein, matters different from in the first embodiment are described.

The upper surface of the lower radiating layer 4 is in contact with a second connecting portion 28 comprising a metal material having high thermal conductivity, such as Cu, Au, or the like.

Also, an intermediate radiating layer 26 comprising the same permalloy as the upper shield layer 9 is formed in the rear of the upper shield layer 9. The intermediate radiating layer 26 faces the lower radiating layer 4 and is connected to the lower radiating layer 4 through the second connecting portion 28.

Almost the entire upper surface of the intermediate radiating layer 26 is exposed from the separating insulating layer 12. An upper radiating layer 27 comprises the same permalloy as the lower core layer 13 and faces the intermediate radiating layer 26. A first connecting portion 29 comprising a metal material having high thermal conductivity, such as Cu, Au, or the like, is provided to pass through the separating insulating layer 12 and come in contact with the upper radiating layer 27 and the intermediate radiating layer 26.

In the second embodiment, the upper radiating layer 27 is integrated with the intermediate radiating layer 26 and the lower radiating layer 4 through the second connecting portion 28 and first connecting portion 29 each comprising a metal material having high thermal conductivity. Therefore, heat is rapidly transferred from the upper radiating layer 27 to the lower radiating layer 4, and thus heat of the first coil 21 and the second coil 23 is easily released to the slider 1.

The method of manufacturing the thin film magnetic head of the second embodiment comprises removing the insulating layer 5 from the top of the lower radiating layer 4, and then forming the second connecting portion 28 by plating a metal film of Cu, Au or the like. After the second connecting portion 28 is formed, the intermediate radiating layer 26 is formed by plating a permalloy film.

Then, the separating insulating layer 12 is formed to cover the intermediate radiating layer 26 and the upper shield layer 9, and then the separating insulating layer 12 is removed from the top of the intermediate radiating layer 26. Then, the first connecting portion 29 is formed by plating a metal film of Cu, Au, or the like. After the first connecting portion 29 is formed, the upper radiating layer 27 is formed by plating a permalloy film.

Figure 4:
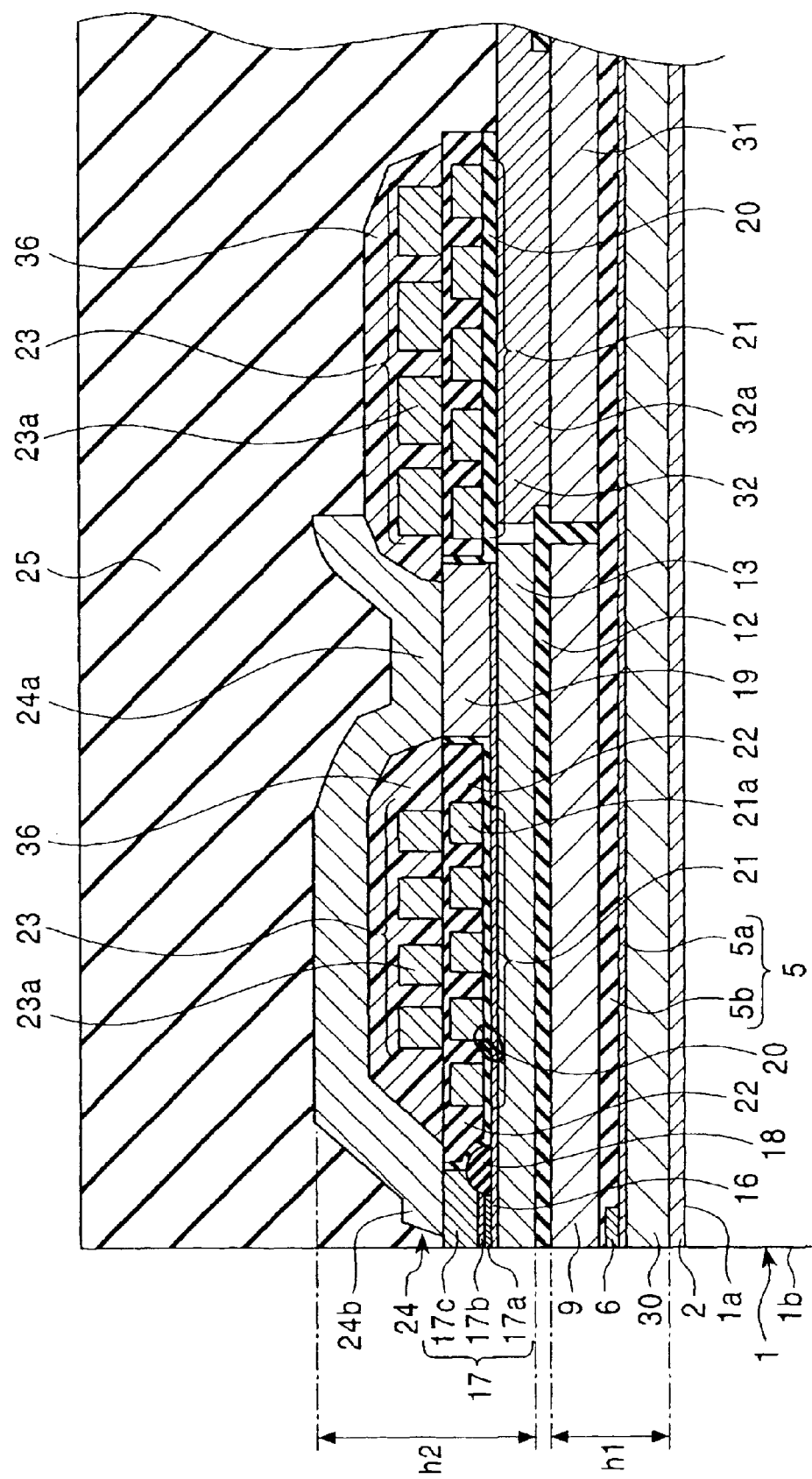
FIG. 4 is a sectional view of a thin film magnetic head according to a third embodiment of the present invention.

FIG. 4 is a sectional view of a thin film magnetic head according to a third embodiment of the present invention. In the embodiment shown in FIG. 4, the same members as in the first embodiment are denoted by the same reference numerals, and the description thereof is omitted. Herein, matters different from in the first embodiment are described.

In the third embodiment, a lower shield layer 30 is formed in a wider range than that in the first embodiment to extend to the rear of a connecting layer of the recording section h2. The entire surfaces of the first coil 21 and the second coil 23 of the recording section h2 are formed on the lower shield layer 30.

The lower shield layer 30 is covered with the insulating layer 5 which covers the magnetoresistive element 6, and an intermediate radiating layer 31 comprising the same permalloy as the upper shield layer 9 is formed on the insulating layer 5 to be positioned in the rear of the upper shield layer 9.

The intermediate radiating layer 31 faces the lower shield layer 30 with the insulating layer 5 provided therebetween so that the intermediate radiating layer 31 is insulated from the lower shield layer 30 by the insulating layer 5. The intermediate radiating layer 31 is not exposed at the magnetic disk-facing surface 1b of the slider 1.

The upper shield layer 9 and the intermediate radiating layer 31 are covered with the separating insulating layer 12. Almost the entire upper surface of the intermediate radiating layer 31 is exposed from the separating insulating layer 12.

The lower core layer 13 of the recording section h2 and an upper radiating layer 32 comprising the same permalloy as the lower core layer 13 are formed on the separating insulating layer 12.

The upper radiating layer 32 is formed in the rear of the lower core layer 13 without making contact with the lower core layer 13. The upper radiating layer 32 is not exposed at the magnetic disk-facing surface 1b of the slider 1.

The upper radiating layer 32 has a first connecting portion 32a integrally formed to pass through the separating insulating layer 12 and come in contact with the intermediate insulating layer 31. The upper radiating layer 32 is connected to the intermediate radiating layer 31 through the first connecting portion 32a of the upper radiating layer 32.

The manufacturing method according to the third embodiment is substantially the same as that of the first embodiment except that a pattern of the lower shield layer 30 is different from in the first embodiment, and that the insulating layer 5 is not partially removed for forming the intermediate radiating layer 31. Therefore, description is omitted.

In magnetic recording on a magnetic medium using the thin film magnetic head of the third embodiment, like in the first embodiment, Joule heat is generated in the first and second coils 21 and 23 due to a recording current.

The upper radiating layer 32 is integrated with the intermediate radiating layer 31 through the first connecting portion 32a to increase the heat capacity. Heat of the first and second coils 21 and 23 is released to the upper radiating layer 32 and the intermediate radiating layer 31 which are combined together.

Since the insulating layer 5 is interposed between the lower shield layer 30 and the intermediate radiating layer 31, heat of the intermediate radiating layer 31 is less transferred to the lower shield layer 30. However, even when the heat of the intermediate radiating layer 31 is transmitted to the lower shield layer 30, heat of the lower shield layer 30 is easily released to the slider 1 side, thereby preventing the lower shield layer 30 from being heated to a high temperature.

In the third embodiment, the upper shield layer 9 of the reproducing section h1 is separated from the lower core layer 13 of the recording section h2, and the intermediate radiating layer 31 formed in the rear of the upper shield layer 9 is integrated with the upper radiating layer 32 formed in the rear of the lower core layer 13 through the first connecting portion 32a. However, when the upper shield layer 9 of the reproducing section h1 is also used as the lower core layer 13 of the recording section h2, i.e., when the upper shield layer 9 and the lower core layer 13 are continuously formed into one unit without the separating insulating layer 12, the upper radiating layer 32 and the intermediate radiating layer 31 may be continuously formed into a unit.

In each of the first, second and third embodiments, each of the upper radiating layer 15, 27 or 32 and the intermediate radiating layer 11, 26 or 31 comprises a magnetic metal having not so high thermal conductivity, and thus the upper radiating layer 15, 27 or 32 and the intermediate radiating layer 11, 26 or 31 are preferably combined together with the connecting portion 15a, 29 or 32a to increase the heat capacity. However, the separating insulating layer 12 may be interposed between the upper radiating layer 15, 27 or 32 and the intermediate radiating layer 11, 26 or 31 without the connecting portion 15a, 29 or 32a. The intermediate radiating layer 11, 26 or 31 need not be provided as long as the upper radiating layer 15, 27 or 32 separating from the lower core layer 13 faces the first and second coils 21 and 23.

Figure 5:
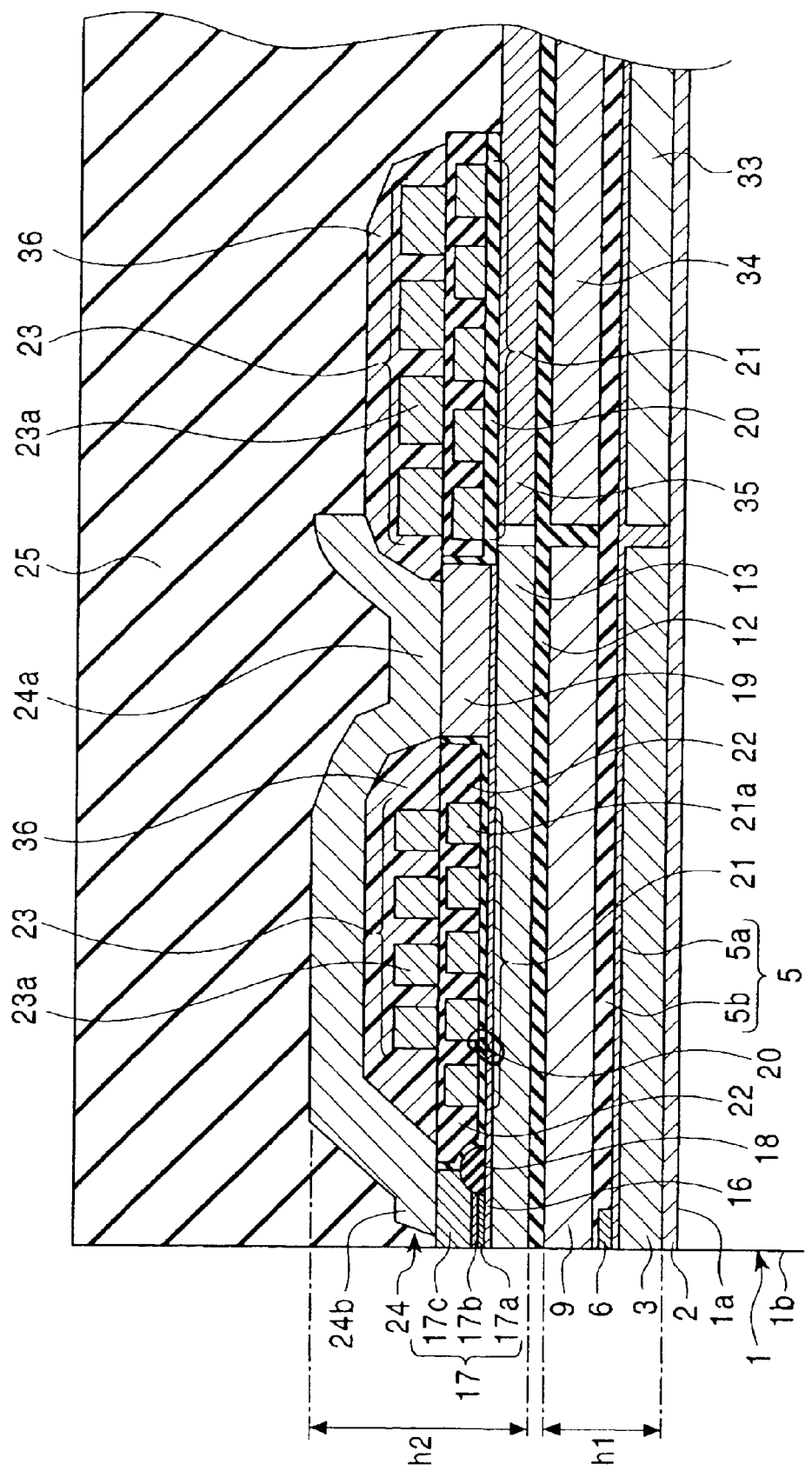
FIG. 5 is a sectional view of a thin film magnetic head according to a fourth embodiment of the present invention.
Figure 6:
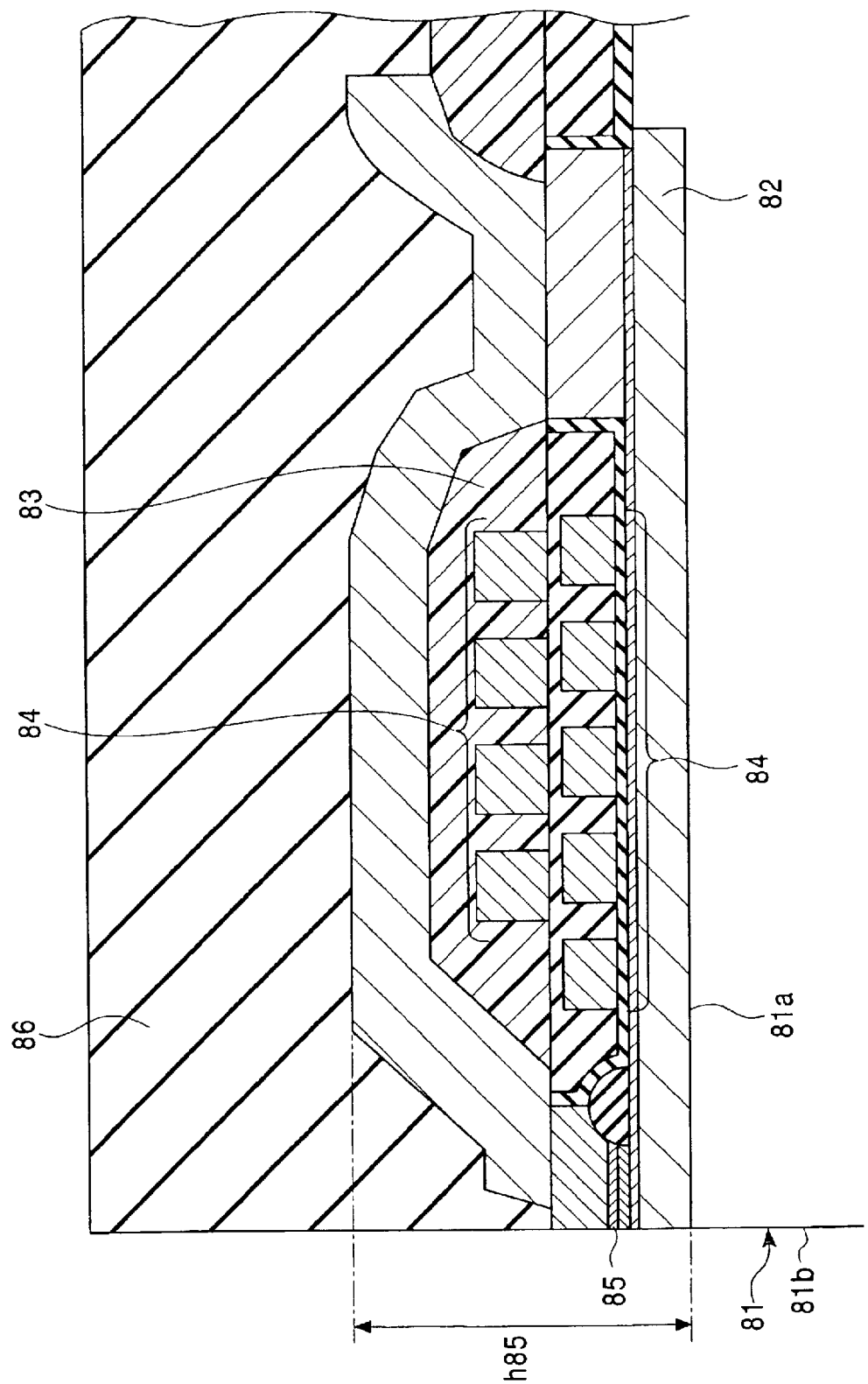
FIG. 6 is a sectional view of a conventional thin film magnetic head.
Figure 7:
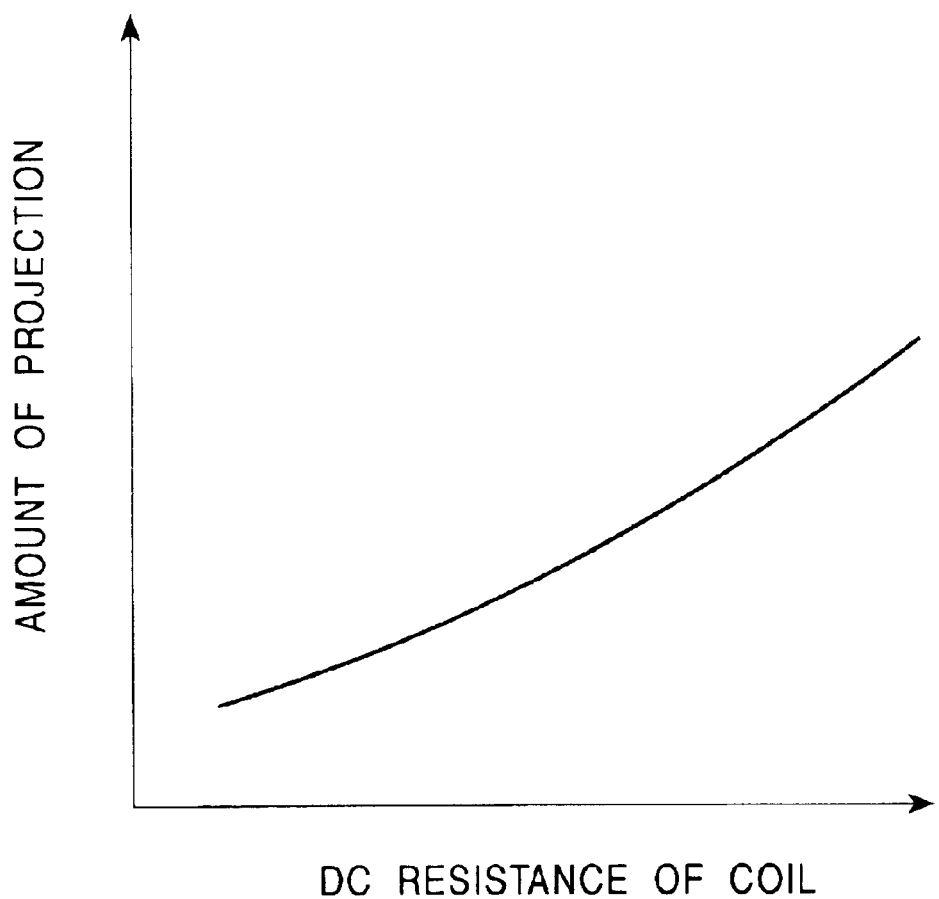
FIG. 7 is a graph showing the relation between the DC resistance of a conductor layer of a coil and a projection amount.

FIG. 5 is a sectional view of a thin film magnetic head according to a fourth embodiment of the present invention. In the embodiment shown in FIG. 5, the same members as in the first embodiment are denoted by the same reference numerals, and the description thereof is omitted. Herein, matters different from in the first embodiment are described.

In the fourth embodiment, a lower radiating layer 33 comprises a metal material having high thermal conductivity, such as Cu, Au, or the like, and is formed in the rear of the lower shield layer 3 comprising permalloy or the like. The lower radiating layer 33 is not brought into contact with the lower shield layer 3 and not exposed at the magnetic disk-facing surface 1b of the slider 1. The lower shield layer 3 and the lower radiating layer 33 are covered with an insulating layer 5 which covers the magnetoresistive element 6.

The upper shield layer 9 comprising permalloy faces the lower shield layer 3 through the insulating layer 5. An intermediate radiating layer 34 comprising a metal material having high thermal conductivity, such as Cu, Au, or the like, is formed around the upper shield layer 9 on the insulating layer 5 without making contact with the upper shield layer 9. The intermediate radiating layer 34 is not exposed at the magnetic disk-facing surface 1b of the slider 1.

The intermediate radiating layer 34 and the lower radiating layer 33 face each other with the insulating layer 5 provided therebetween and are insulated from each other with the insulating layer 5.

The upper shield layer 9 and the intermediate radiating layer 34 are covered with a separating insulating layer 12. A lower core layer 13 comprising permalloy is formed on the separating insulating layer 12 so that the lower core layer 13 and the upper shield layer 9 face each other with the separating insulating layer 12 provided therebetween.

Also, an upper radiating layer 35 comprising a metal material having high thermal conductivity, such as Cu, Au, or the like, is formed around the lower core layer 13 on the separating insulating layer 12. The upper radiating layer 35 is not brought into contact with the lower core layer 13 and is not exposed at the magnetic disk-facing surface 1b of the slider 1. The upper radiating layer 35 and the intermediate radiating layer 34 face each other with the separating insulating layer 12 provided therebetween and are insulated from each other with the separating insulating layer 12.

The manufacturing method according to the fourth embodiment comprises the step of plating a permalloy film on the under coat 2 to form the lower shield layer 3, plating a metal film of Cu, Au or the like to form the lower radiating layer 33, and then forming the insulating layer 5 to cover the lower shield layer 3 and the lower radiating layer 33.

The manufacturing method further comprises the steps of plating a permalloy film on the insulating film 5 to form the upper shield layer 9, plating a metal film of Cu, Au or the like to form the intermediate radiating layer 34, and then forming the separating insulating layer 12 to cover the upper shield layer 9 and the intermediate radiating layer 34.

The manufacturing method further comprises the steps of plating a permalloy film on the separating insulating film 12 to form the lower core layer 13, and plating a metal film of Cu, Au or the like to form the upper radiating layer 35.

In magnetic recording on a magnetic medium using the thin film magnetic head of the fourth embodiment, like in the first embodiment, Joule heat is generated in the first and second coils 21 and 23 due to a recording current.

The upper radiating layer 35 comprises a metal having higher thermal conductivity than permalloy, and thus heat of the first and second coils 21 and 23 is more easily released to the upper radiating layer 35 than to the lower core layer 13.

Although the upper insulating layer 35 and the intermediate radiating layer 34 are separated from each other by the separating insulating layer 12, heat of the upper radiating layer 35 is transmitted to the intermediate radiating layer 34 through the separating insulating layer 12 because the intermediate radiating layer 34 comprises a material having high thermal conductivity.

Although the intermediate radiating layer 34 and the lower radiating layer 33 are separated from each other by the insulating layer 5, heat of the intermediate radiating layer 34 is transmitted to the lower radiating layer 33 through the insulating layer 5 because the lower radiating layer 33 comprises a material having high thermal conductivity. As a result, the heat of the first and second coils 21 and 23 is released to the slider 1 from the lower radiating layer 33.

In the fourth embodiment, all the lower radiating layer 33, the intermediate radiating layer 34 and the upper radiating layer 35 comprise a metal having higher thermal conductivity than that of a magnetic material such as permalloy. However, when any one of the lower radiating layer 33, the intermediate radiating layer 34 and the upper radiating layer 35 comprises a metal having higher thermal conductivity, the other radiating layers may comprise the same magnetic material as the lower core layer 13, the upper shield layer 9 and the lower shield layer 3. Particularly, the upper radiating layer 35 nearest to the first and second coils 21 and 23 preferably comprises a metal having higher thermal conductivity.

In order to facilitate the release of heat from the first and second coils 21 and 23 to the upper radiating layer 35, heat of the upper radiating layer 35 is preferably released to the intermediate radiating layer 34 and the lower radiating layer 33. However, the intermediate radiating layer 34 and the lower radiating layer 33 need not be provided as long as the upper radiating layer 35 is separated from the lower core layer 13 and faces the first and second coils 21 and 23.

Although, in the fourth embodiment, the lower radiating layer 33 and the intermediate radiating layer 34 are separated from each other by the insulating layer 5, the lower radiating layer 33 may be exposed from the insulating layer 5, and a connecting portion may be provided for connecting the lower radiating layer 33 and the intermediate radiating layer 34.

The connecting portion for connecting the lower radiating layer 33 and the intermediate radiating layer 34 may be formed integrally with the intermediate radiating layer 34, or may be made of the same permalloy as the upper shield layer 9. The connecting portion made of the same permalloy as the upper shield layer 9 can be formed at the same time as the upper shield layer 9.

Although, in the fourth embodiment, the intermediate radiating layer 34 and the upper radiating layer 35 are separated from each other by the separating insulating layer 12, the intermediate radiating layer 34 may be exposed from the separating insulating layer 12, and a connecting portion may be provided for connecting the intermediate radiating layer 34 and the upper radiating layer 34.

The connecting portion for connecting the intermediate radiating layer 34 and the upper radiating layer 35 may be formed integrally with the upper radiating layer 35, or may be made of the same permalloy as the lower core layer 13. The connecting portion made of the same permalloy as the lower core layer 13 can be formed at the same time as the lower core layer 13.

As described above in the first to fourth embodiments, heat of the first and second coils 21 and 23 is released to the upper radiating layer 15, 27, 32 or 35 separating from the lower core layer 13.

Also, in each of the first to fourth embodiments, the lower shield layer 3 and the upper shield layer 9 of the reproducing section h1 may be connected to a connecting portion comprising a metal in the rear of the magnetoresistive element 6.

When the lower shield layer 3 is connected to the upper shield layer 9, even if the upper shield layer 9 is heated, heat of the upper shield layer 9 is transmitted to the lower shield layer through the connecting portion, and preferably easily released to the slider 1 from the lower shield layer 3.

Also, when the upper shield layer 9 and the lower shield layer 3 are connected to a connecting portion comprising a metal, the upper shield layer 9 and the lower shield layer 3 have a same potential to improve the corrosion resistance of the upper shield layer 9 and the lower shield layer 3.

Furthermore, at least one of the lower radiating layer 4, the intermediate radiating layer 11 and the upper radiating layer 15 may be formed, and each of the coils 21 and 23 may have a portion facing the radiating layer provided.

Furthermore, at least two of the lower radiating layer 4, the intermediate radiating layer 11 and the upper radiating layer 15 are preferably provided so that the radiating layers provided partially face each other in the thickness direction. As a result, the radiating layers can be appropriately connected to each other through the connecting portions 11a and 28.

The radiating layer provided is preferably formed to extend to both sides in the width direction of a magnetic layer (any one of the lower shield layer 3, the upper shield layer 9 and the lower core layer 13) provided in front of the radiating layer. The width direction means a direction in

What is claimed is:

1. A thin film magnetic head comprising:

a lower core layer;

an upper core layer;

a recording section comprising a nonmagnetic gap layer disposed between the lower and upper core layers near a surface facing a recording medium;

a connecting portion for magnetically connecting a lower core layer and the upper core layer in the rear of the recording section;

a coil comprising a conductor layer wound in a spiral planar shape around the connecting portion; and a first radiating layer disposed in the rear of a lower core layer to be separated from the lower core layer;

wherein the coil has a portion facing the lower core layer through an insulating layer, and a portion facing the first radiating layer through the insulating layer.

2. A thin film magnetic head comprising:

a lower core layer;

an upper core layer;

a recording section comprising a nonmagnetic gap layer disposed between the lower and upper core layers near a surface facing a recording medium;

a connecting portion for magnetically connecting the lower core layer and the upper core layer in a rear of the recording section;

a coil comprising a conductor layer wound in a spiral planar shape around the connecting portion;

an upper shield layer disposed below the lower core layer with a separating insulating layer provided therebetween, the separating insulating layer comprising an insulating material;

a reproducing magnetoresistive element disposed below the upper shield layer a surface facing the recording medium;

a lower shield layer disposed below the magnetoresistive element with an insulating layer provided therebetween; and at least one of first, second and third radiating layers;

wherein the first radiating layer is disposed in a rear of the lower core layer to be separated from the lower core layer, the second radiating layer is disposed in a rear of the upper shield layer to be separated from the upper shield layer, and the third radiating layer is disposed in the rear of the lower shield layer to be separated from the lower shield layer; and the coil has a portion facing the lower core layer through an insulating layer, and a portion facing any one of the first, second and third radiating layers through the insulating layer.

3. A thin film magnetic head according to claim 2, wherein at least two of the first, second and third radiating layers are provided to partially face each other in a thickness direction.

4. A thin film magnetic head according to claim 2, wherein assuming that a direction along a direction in which a track width of the recording section is determined is a width direction, the second radiating layer extends to both ends of the upper shield layer in the width direction.

5. A thin film magnetic head according to claim 2, wherein the second radiating layer is formed to the same thickness as the upper shield layer by using the same material as the upper shield layer.

6. A thin film magnetic head according to claim 2, wherein the second radiating layer is formed to the same thickness as the upper shield layer by using a material having higher thermal conductivity than that of the upper shield layer.

7. A thin film magnetic head according to claim 2, wherein the second radiating layer and first radiating layer are connected to each other through a first connecting portion.

8. A thin film magnetic head according to claim 7, wherein the first connecting portion is combined with one of the first and second radiating layers.

9. A thin film magnetic head according to claim 2, wherein assuming that a direction along a direction in which a track width of the recording section is determined is a width direction, the third radiating layer extends to both ends of the lower shielding layer in the width direction.

10. A thin film magnetic head according to claim 2, wherein the third radiating layer is formed to the same thickness as that of the lower shield layer by using the same material as the lower shield layer.

11. A thin film magnetic head according to claim 2, wherein the third radiating layer us formed to the same thickness as that of the lower shield layer by using a material having higher thermal conductivity than that of the lower shield layer.

12. A thin film magnetic head according to claim 2, wherein the third radiating layer and the second radiating layer are connected to each other through a second connecting portion.

13. A thin film magnetic head according to claim 12, wherein the second connecting portion is combined with one of the second and third radiating layers.

14. A thin film magnetic head according to claim 2, wherein assuming that a direction along a direction in which a track width of the recording section is determined is a width direction, the first radiating layer extends to both ends of the lower core layer in the width direction.

15. A thin film magnetic head according to claim 2, wherein the first radiating layer is formed to the same thickness as that of the lower core layer by using the same material as the lower core layer.

16. A thin film magnetic head according to claim 2, wherein the first radiating layer is formed to the same thickness as that of the lower core layer by using a material having higher thermal conductivity than that of the lower core layer.

17. A thin film magnetic head according to claim 2, wherein a facing area between the coil and the lower core layer is larger than that between the coil and the first radiating layer.

18. A thin film magnetic head according to claim 1, wherein assuming that a direction along a direction in which a track width of the recording section is determined is a width direction, the first radiating layer extends to both ends of the lower core layer in the width direction.

19. A thin film magnetic head according to claim 1, wherein the first radiating layer is formed to the same thickness as that of the lower core layer by using the same material as the lower core layer.

20. A thin film magnetic head according to claim 1, wherein the first radiating layer is formed to the same thickness as that of the lower core layer by using a material having higher thermal conductivity than that of the lower core layer.

21. A thin film magnetic head according to claim 1, wherein a facing area between the coil and the lower core layer is larger than that between the coil and the first radiating layer.

* * * * *